United States Patent [19]

Kurihara et al.

[11] 4,017,684
[45] Apr. 12, 1977

[54] SYSTEM FOR DETERMINING BURST SENDING TIMING IN TDMA COMMUNICATION

[75] Inventors: Hiroshi Kurihara, Tokyo; Akira Ogawa, Machida; Yasuo Hirata, Tokyo, all of Japan

[73] Assignee: Kokusai Denshin Denwa Kabushiki Kaisha, Japan

[22] Filed: July 3, 1975

[21] Appl. No.: 592,717

[30] Foreign Application Priority Data

July 5, 1974    Japan ............................. 49-76499

[52] U.S. Cl. .................... 178/69.1; 179/15 BS; 325/4
[51] Int. Cl.$^2$ .................................. H04S 3/06
[58] Field of Search .......... 178/69.5 R; 179/15 BS, 179/15 BM; 325/320, 4

[56] References Cited

UNITED STATES PATENTS

| | | | |
|---|---|---|---|
| 3,769,587 | 10/1973 | Matsuo | 178/69.5 R |
| 3,804,985 | 4/1974 | Matsuo | 178/69.5 R |
| 3,883,729 | 5/1975 | Cremiers | 178/69.5 R |
| 3,898,388 | 8/1975 | Goodwin | 178/69.5 R |

Primary Examiner—Harold I. Pitts
Attorney, Agent, or Firm—Robert E. Burns; Emmanuel J. Lobato; Bruce L. Adams

[57] ABSTRACT

A system for determining burst sending timing in a time division multiple access communication system using a communication satellite, in which burst signals transmitted from a plurality of stations are arranged on the communication satellite in one frame at predetermined intervals. On the transmitting side connected to the communication satellite through a radio wave path, a first signal composed of a first signal state over one frame length defined by the sending frame timing is sent, and then second, third, fourth, . . . signals each composed of the first signal state and a second state different from the first signal state are sent. In this case, the position or length of the first signal state in one frame is altered by a certain amount. On the receiving side connected to the communication satellite through a radio wave path, the number of frames of the burst signals transmitted is counted during a duration from the detection of the first signal to the detection of the next first or second state at a predetermined time slot in a frame of the burst signals, and the sending timing of each station based on the sending frame timing is determined on the base of the counted number of frames and the certain amount.

4 Claims, 5 Drawing Figures

SYSTEM FOR DETERMINING BURST SENDING TIMING IN TDMA COMMUNICATION

FIELD OF THE INVENTION

This invention relates to a system for determining burst sending timing, and more particularly to a system for determining burst sending timing for initial acquisition in a time division multiple access communication system using a communication satellite.

BRIEF DESCRIPTION OF THE PRIOR ART

The initial acquisition of the time division multiple access communication system (hereinafter referred to as TDMA system) is a process in which, on a satellite, a burst signal of a station starting communication (hereinafter referred to as an acquiring station) is placed in one of a plurality of time slots of certain length previously allocated within a frame, thereby to establish synchronization of the communication burst of the aquiring station with that of another station having already engaged in communication. In order to place the burst signal in a predetermined time slot in the initial acquisition, it is necessary to determine a correct timing at which the burst should be sent from the same station. For this purpose, a conventional satellite communication system requires measurement of the propagation time for a terrestrial station to the satellite. In practice, however, measurement of this propagation time is extremely troublesome. Namely, since terrestrial stations are located at geographically different places, the distances between the terrestrial stations and the satellite, that is, the radio wave propagation time therebetween, differ from each other and, further, since the satellite generally called a stationary one is also actually slightly moving, the propagation time slightly fluctuates every moment and, moreover, use is made of distance information separately prepared which involves large-scale equipment. Thus, complicated and time-consuming operations are required.

BRIEF SUMMARY OF THE INVENTION

An object of this invention is to provide a system for determining burst sending timing which enables easy, rapid and accurate detection of the sending timing of the same station without examining the abovesaid propagation time in the initial acquisition.

For convenience of explanation of this invention, a brief description will be given first with regard to a method, called a low level method, which is related to this invention and is one of the conventional initial acquisition methods.

In this low level method, a signal for acquisition (referred to as the acquisition signal) whereby a specified point of a burst signal, for example, the rise-up position of the burst signal, is marked, is sent at a level low enough not to markedly disturb a communication burst signal of another station already engaged in communication, and a communication burst signal is transmitted in place of the acquisition signal at the sending timing when the marked point of the aforesaid acquisition signal has been received in a predetermined time slot.

The waveform of the acquisition signal employed is a pulse, a continuous wave (a sine or rectangular wave), PN code or the like, which is usually transmitted in a modulated wave form. Since the acquisition signal is transmitted at an extremely low level as compared with the communication signal as described above, the following two methods are employed for extracting the marked point with required accuracy. In one of the methods, since the time slot in which the burst signal is to be placed is idle and can be expected to obtain an excellent S/N ratio, detection of the marked point of the acquisition signal is achieved only in this idle time slot. In the other method, the S/N ratio is improved by means of narrow-band filtering regardless of whether or not the acquisition signal overlaps with the communication burst signals of other stations and then the marked point of the acquisition signal is detected. This invention employs the former method.

A conventional type of the transponder on a satellite is of wide band and of excellent linearity for common amplification of many carriers to prevent cross modulation. Therefore, the latter one of the abovesaid methods, which is not time-consuming and easy in operation, has heretofore been employed for the detection of the marked point, too. However, in the future, especially at a future stage where time division multiple access satellite communication will be put to practical use, it is expected that the satellite amplifies a carrier wave with one transponder and operates in a non-linear area from the viewpoint of efficient use of power. Accordingly, the transponder performs a nonlinear operation in the presence of the communication burst and it is feared that the non-linear operation will cause a great fluctuation in the phase of the acquisition signal of low level superposed on the burst signal. This phase fluctuation introduces a difference in the phase of the acquisition signal passing through the satellite transponder between the part of the signal which overlaps with the communication signal and the part which does not overlap therewith. As a result of this, the marked point of the received acquisition signal contains the above phase fluctuation and a serious error is anticipated.

In view of the above, this invention is designed such that a special acquisition signal is transmitted to a satellite; and, in the receiving side, the acquisition signal is detected in the time slot assigned to the acquiring station and, in response to the detected result, the transmit timing of the burst of the station is determined.

BRIEF DESCRIPTION OF THE DRAWINGS

The principle, construction and operation of this invention will be clearly understood from the following detailed description taken in conjunction with the accompanying drawings, in which.

DETAILED DESCRIPTION OF THE INVENTION

Figure 1:
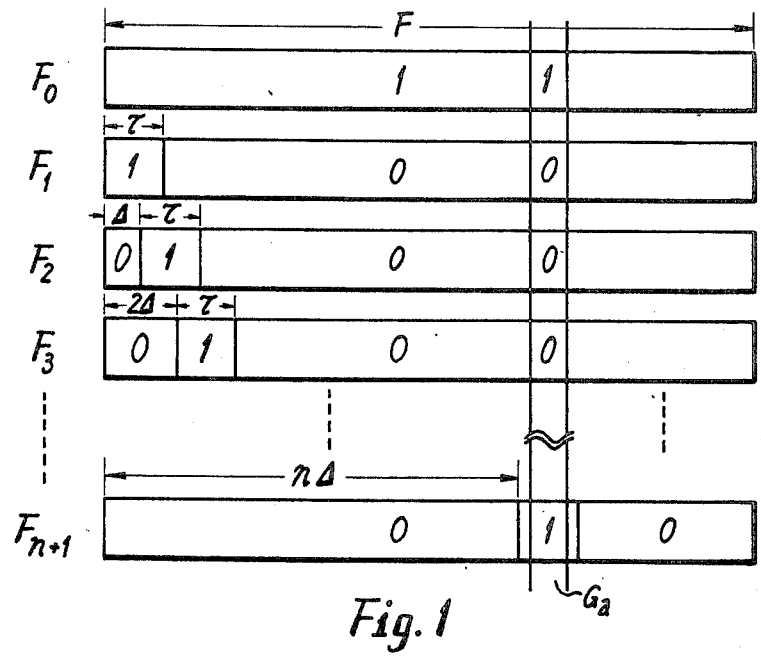
FIG. 1 shows a signal configuration diagram explanatory of the principle of this invention.

The principles of this invention will be described in connection with FIG. 1. In FIG. 1, reference character F indicates frames and suffixes designate their numbers. In the first frame $F_0$, a signal indicative of a state "1" is continued. In a next frame $F_1$, a signal is composed mostly of a signal indicative of a state "0" but a signal of the state "1" and having a width $\tau$ (which signal will hereinafter be referred to as the signal $\tau$, for the sake of convenience) is inserted in the signal of the state "0". The position of the signal $\tau$ inserted is shifted by $\Delta$ every frame. For example, the position of the signal $\tau$ in the frame $F_{n+1}$ is shifted by $n\Delta$ from the position of the first frame. This shift is continued over for substantially one frame length until the signal $\tau$ moves to the right of the frame from the beginning thereof (the position of $F_1$) to reach the beginning of the next frame, that is, returns to the condition of the frame $F_1$. Such an acquisition signal produced in the transmitting side and sent therefrom is generally delayed during propagation but is received in exactly the same form as sent out. Then, if an aperture gate $Ga$ of appropriate width provided in the time slot assigned to the acquiring station is set at such position as shown in FIG. 1, the signals of the states "1", "0" and "1" are detected in the aperture gate Ga in the frame $F_0$, in the frames $F_1, F_2, F_3, \ldots$ and in the frame $F_{n+1}$, respectively. Accordingly, the number of frames from the state "1" in the frame $F_0$ to the state "1" in the frame $F_{n+1}$ is equal to $n$, and the transmit timing in a case of the signal $\tau$ being received in the aperture gate Ga is shifted by $n\Delta$ relative to the frame timing of the frame $F_0$. Consequently, communication bursts sent out at this timing are placed in predetermined time slots.

If a S/N ratio of the received signal is sufficiently high, since probability of signal detection is fully high and probability of false detection is sufficiently low, the detection of the state "1" can be achieved without fail. Accordingly, the principle diagram of FIG. 1 can be used as it is. In practical satellite communication, however, since the S/N ratio of the received signal is low, it is better to employ an averaging operation in order to acurately detect the state "1" by improving the probability of signal detection and that of false detection. To this purpose, it is preferred that a plurality of frames $F_0$ in which the state "1" is continued are employed and that, for the detection of the pulse-like signal of the state "1", the width $\tau$ of the pulse-like signal of the state "1" is selected so that the aperture gate $Ga$ may overlap with this signal by a number of times necessary for averaging. Of course, in case of achieving such an averaging operation, the number of frames for the averaging operation is added to the number of frames counted, so that it is necessary to previously compensate for the added frames. Further, in FIG. 1, the signal of the state "1" is used as the signal $\tau$. However, if this signal portion is replaced by the signal of the state "0" and the other signal portion is composed of the signal of the state "1" while the number of frames from the first detection of the state "1" to the next detection of the state "0" is counted in the receiving side, the results are exactly the same as those described above.

Figure 2:
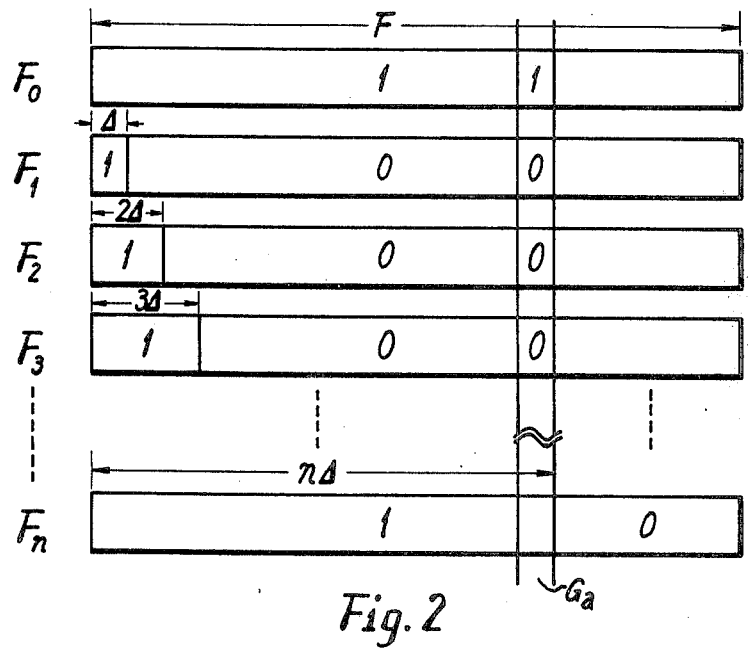
FIG. 2 shows another signal configuration diagram explanatory of the principle of this invention.

In the above, after the signal of the state "1" is continued for one frame, the state "1" or "0" used as the signal $\tau$ is shifted (the direction of shifting may also be leftward) in the state "0" or "1" and the width of the signal $\tau$ is held constant. Also in such a method as shown in FIG. 2, it is possible to obtain exactly the same results as obtainable by the above method. Reference numerals and characters in FIG. 2 are exactly the same as those in FIG. 1. The difference from FIG. 1 resides only in that the duration of the signal $\tau$ is lengthened by a time $\Delta$ per frame as compared with the above case. If the signal of the state "0" is used as the signal $\tau$ in place of the signal of the state "1", the same results are obtained.

Figure 3A:
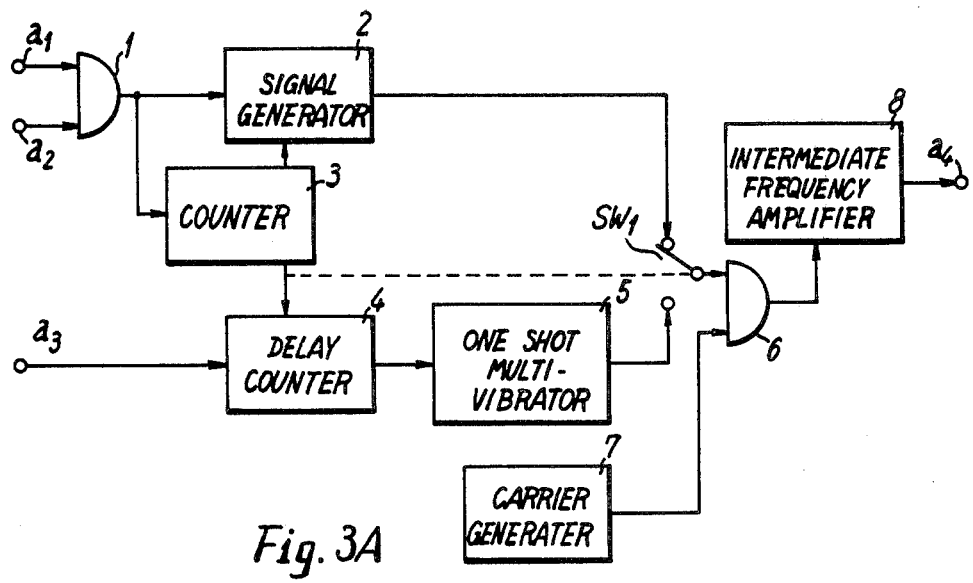
FIGS. 3A and 3B are block diagrams illustrating the sending side and the receiving side of an embodiment of this invention.
Figure 3B:
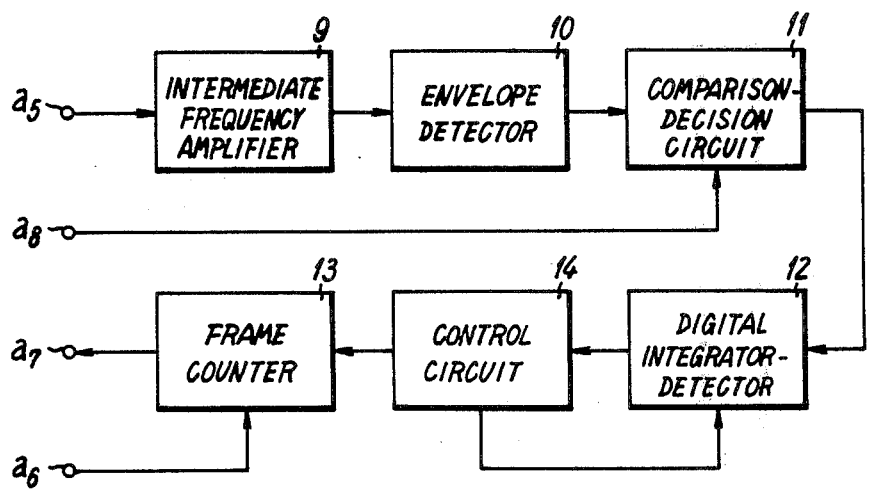

FIG. 3 illustrates an embodiment of this invention which is constructed in accordance with the principle described with reference to FIG. 1. FIGS. 3A and 3B show the structures of the sending and receiving sides, respectively. In FIGS. 3A and 3B, reference character $a_1$ indicates an input terminal for an acquisition start signal which is a signal for sending an acquisition signal to start initial acquisition and is usually generated in a command control unit of a TDMA terminal; $a_2$ designates an input terminal for frame pulses (e.g. having a repetition period of: 125 micro-seconds) which are employed for providing the position and repetition timing of a burst signal used in TDMA communication and are used everywhere in the TDMA terminal; $a_3$ identifies an input terminal for communication symbol clock pulses (e.g. 40 nano-seconds) which are employed for providing a communication speed of information in a sending section; $a_4$ represents a terminal for sending out an acquisition signal of the intermediate-frequency band; $a_5$ denotes a terminal for receiving the acquisition signal of the intermediate frequency; $a_6$ shows a frame pulse input terminal identical with the terminal $a_2$; $a_7$ refers to an output terminal for sending out pulses indicative of the number of frames counted; and $a_8$ indicates an input terminal for an aperture gate which is a window for capturing a unique word placed in a burst substantially at the head thereof and whose width is increased a little in the initial acquisition. Reference numeral 1 designates a gate circuit; 2 identifies a signal generator for producing a signal of the state "1" throughout a certain number of frames; 3 represents a counter for counting the number of frames; 4 denotes a delay counter having a scale of 3125 (125/0.04) plus ten, for example, for shifting the signal $\tau$ by a time $\Delta$ per frame; 5 shows a oneshot multivibrator which operates with overflow carry pulses of the delay counter 4 to produce pulses of a width $\tau$; 6 refers to a gate circuit; 7 indicates a carrier generator; 8 designates an intermediate-frequency amplifier; and $SW_1$ identifies a switch.

In FIG. 3B, reference numeral 9 denotes an intermediate-frequency amplifier including a filter circuit; 10 represents an envelope detector; and 11 shows a comparison-decision circuit which compares the output of the envelope detector 10 with certain reference value to decide the presence or absence of a signal in the aperture gate and which is constructed with a combination of, for example, a differential amplifier with a constant reference input and an AND circuit. Reference numeral 12 refers to a digital integrator-detector for digitally integrating the output of the comparison-decision circuit 11 to detect the presence or absence of a signal by using a decision reached by majority logic; 13 indicates a frame counter; and 14 designates a control circuit which is composed of; for example, a counter and a gate and produces a reset pulse at every reception of a pulse indicative of the presence-of-signal detected by the digital integrator-detector 12 to thereby control the digital integrator-detector 12 and the frame counter 13. As is evident from the above construction, the example of FIG. 3 is designed so that a distinction between the states "1" and "0" is provided in the form of the presence or absence of a signal in FIG. 1. Further, the frame pulses and the aperture gate are generated in a time division multiple access satellite communication system not shown.

The operation of the present embodiment will hereinafter be described. When the acquisition start signal is applied from the terminal $a_1$, the gate circuit 1 supplies frame pulses fed from terminal $a_2$ to the signal generator 2 and the counter 3. Under the control of the counter 3, the signal generator 2 continuously generates the signal of the state "1" during a certain number of frames from a first frame pulse. The switch $SW_1$ is connected first to the side indicated, so that the output from the signal generator circuit 2 opens the gate circuit 6 through the switch $SW_1$ to apply the output of the carrier generator 7 to the intermediate-frequency amplifier 8, the output of which is applied through a terminal $a_4$ to a high-frequency transmission system (not shown). When the counter 3 has counted a predetermined number of frames, the carry pulse of the counter 3 puts the output state of the signal generator 2 to the state "0" and resets the delay counter 4 and, at the same time, switches the switch $SW_1$ to the opposite side. Upon resetting of the delay counter 4, a pulse is applied to the one-shot multivibrator 5 at that timing, by which a pulse of the state "1" and having a duration $\tau$ is applied to the gate circuit 6 through the switch $SW_1$, thus providing the output of the carrier generator 7 for a period of time $\tau$. This state just corresponds to the frame $F_1$ in FIG. 1. After resetting of the delay counter 4, the delay counter 4 counts the communication symbol clock pulses fed from the terminal $a_3$ for each duration of one frame F plus a time $\Delta$ and applies its carry pulses to the one-shot multivibrator 5, thereby obtaining the output of the carrier generator circuit 7 for each period of time $\tau$ shifted by a time $\Delta$ per frame as shown by frames $F_2, \ldots, F_n$.

The acquisition signal sent from the terminal $a_4$ is converted into a signal of a radio frequency and then amplified, thereafter sent from an antenna to a satellite. the acquisition signal returned to the earth through a satellite transponder is received by the antenna and then amplified, thereafter converted into a signal of the intermediate-frequency band and applied to the terminal $a_5$.

The received acquisition signal applied to the terminal $a_5$ is amplified and band-limited in the intermediate-frequency amplifier 9 including a filter circuit and then envelope-detected by the envelope detector 10. The detected output is compared with a certain reference value in the comparison-decision circuit 11 and, when the detected output exceeds the reference value, the presence of signal is decided and, if it is below the reference value, the absence of signal is decided. This decision is made with respect to the duration of the aperture gate fed from the terminal $a_8$. Since the S/N ratio of the acquisition signal received through the satellite is generally low as described previously, the detection of the presence or absence of signal by one decision operation incurs the possibility of false detection. To diminish the possibility of false detection, the output of the comparison-decision circuit 11 is applied to the digital integrator-detector 12, which employs such decision by majority logic that when the output of the comparison-decision circuit 11 is detected in $n$ out of $m$ frames, the presence of received signal (when $n > 1/2m$, however,) is decided, thus detecting the presence or absence of signal. In this case, it is also possible to employ such a detecting method that when a level after integrating pulses in an analog manner exceeds a certain reference value, the presence of signal is decided. The digital integrator-detector 12 detects the presence of signal twice as described previously (refer to $F_0$ and $F_{n+1}$ in FIG. 1), so that when the presence of signal is detected for the first time, the detected pulse is supplied to the control circuit 14 to open the gate of the frame counter 13 and, at the same time, to reset the digital integrator-detector 12 to prepare for the next signal detection. When the second detection of the presence of the received signal has been achieved in the digital integrator-detector 12, the counting of the frame counter 13 is stopped so that the number of frames between the first and second detections of the presence of the received signal is obtained at the terminal $a_7$. The number of frames counted is then applied to a command control unit of the time division multiple access communication system, though not shown. Assuming that the counted number of frames is, for example, $m$, the communication bursts are sent at the timing where the frame pulses applied to the terminal $a_2$ are shifted by $m \cdot \Delta$, and then a synchronization relationship against the bursts of other stations is established.

Figure 4:
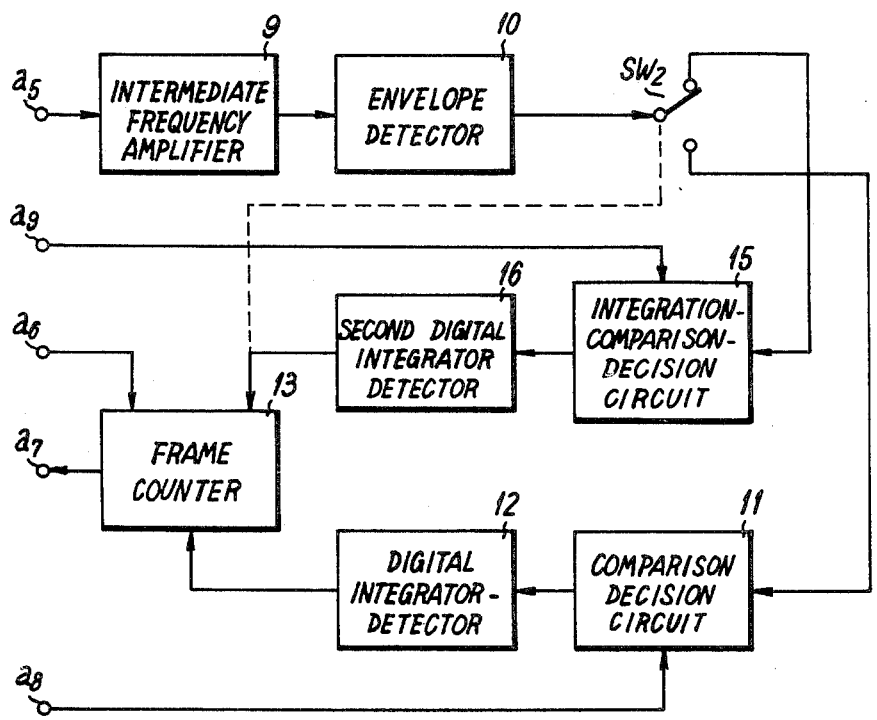
FIG. 4 is a block diagram illustrating the receiving side of another embodiment of this invention.

In the above example, the decision of the presence or absence of the received signal is accomplished only with the aperture gate of a relatively small width. In the decision of the signal $\tau$, the aperture gate is preferred to be of a small width for the purpose of accurately finding out the position of the presence of signal. However, in the detection of the presence of signal for a certain number of frames following the first frame, the aperture gate may be anywhere in the frame, so that it is more efficient to detect the signal throughout a predetermined time slot. FIG. 4 shows another example (only the receiving side) of this invention which is constructed such that a narrow aperture gate and a wide aperture gate are used for the decision of the presence or absence of the received signal for a certain number of frames and for the decision of the presence or absence of the signal $\tau$, respectively. In FIG. 4, the same reference characters and numerals as those in FIG. 3 indicate the same elements. Reference numeral 15 identifies an integration-comparison-decision circuit; and 16 denotes a second digital integrator-detector different from the digital integrator detector 12. Reference character $a_9$ represents an input terminal for the wide aperture gate and $SW_2$ shows a switch. The construction of the sending side corresponding to the receiving side is the same as shown in FIG. 3A but the value counted by the counter 3 becomes smaller. The reason therefor will become apparent from the following description taken in conjunction with FIG. 4.

As in the case with FIGS. 3A and 3B, the received acquisition signal of the intermediate-frequency band is applied from the terminal $a_5$ to the intermediate-frequency amplifier 9 including the filter circuit and then envelope-detected by the envelop detector 10. The switch $SW_2$ is connected first to the side indicated, so that the detected envelop output is applied to the integration-comparison-decision circuit 15, in which the input signal is detected with the wide aperture gate signal applied from the terminal $a_9$ and is integrated in an analog manner. By this integration, the S/N ratio of the input signal is equivalently improved and a decision by comparison with a certain reference value is made with high accuracy as compared with the case of the narrow aperture gate. Accordingly, the number of averaging operations of the decided result is reduced. Namely, the second digital integrator-detector 16 achieves the decision by majority logic operation by effecting the detection of the presence or absence of signal a smaller number of times than in the case of the digital integrator-detector 12, and, upon signal detection, the information is applied to the frame counter 13 to cause it to start counting of the frame pulses from the terminal $a_6$. When an output has been generated from the second digital integrator-detector 16, the switch $SW_2$ is switched to the opposite side for the detection of the next signal $\tau$, and the signal $\tau$ is detected as is the case with FIG. 3. It is sufficient that the digital integrator-detector 12 achieves the signal detection only once unlike in the case of FIG. 3, so that the control circuit 14 shown in FIG. 3 is not necessary. Also in the case of FIG. 4, the counted result by the frame counter 13 is sent from the terminal $a_7$ to the command control unit of the time division multipule access satellite communication system (not shown) and is processed therein.

Although the foregoing description has been given with regard to the examples embodying the principles of this invention shown in FIG. 1, it is a matter of course that examples embodying the principles shown in FIG. 2 can similarly be constructed. Further, in the examples of FIGS. 3 and 4, the states "1" and "0" in FIG. 1 are provided in the form of the presence and absence of signal. However, it is apparent that the invention can also be embodied by the employment of some other method, for example, the so-called frequency shift keying system (FSK system) of providing the states "1" or "0" in the form of two different frequencies or a phase shift keying system (PSK system) of providing the states in the form of different phases.

As has been described in detail in the above, in accordance with this invention, two different states "0" and "1" in terms of digital code, "$f_1$" and "$f_2$" in terms of frequency or "phase 0" and "phase $\pi$" in terms of phase, are defined to be a "first state" and a "second state", respectively. From the sending side, a signal in which one frame (if necessary, several frames) is composed entirely of the "first state" is first sent out, and then signals in which one frame is composed of the "first state" and the "second state" are sequentially sent out, while the position or length of the "first state" in one frame is altered. On the receiving side, the number of frames is counted at the interval between the reception of the signal in which one frame is composed entirely of the "first state" to the reception of the signal of the "first state" or the "second state" in the time slot of one frame assigned to the same station. With the use of the counted value, the sending timing of the communication burst can easily be determined. Further, even if an amplifier of non-linearity is employed in the satellite transponder, rapid initial acquisition can be obtained without being affected by the amplifier. In addition, this system of this invention is to detect the acquisition signal in the assigned time slot within the frame, and hence is applicable to initial acquisition of the time division multiple access communication system employing the satellite switching technique in which the frame is divided on a satellite.

What we claim is:

1. In a system for determining burst sending timing in a time division multiple access communication system of the type including a communication satellite, in which burst signals transmitted from a plurality of stations are received by the communication satellite which includes means for arranging the received time signals within one time frame at predetermined intervals, and means for transmitting the arranged burst signals, the improvement comprising:

a transmitting side in one of said stations for transmitting burst signals to the communication satellite and comprising first transmitting means for transmitting a first signal having a first signal state over one entire frame length, and second transmitting means connected to and coactive with said first transmitting means for transmitting after said first signal a sequence of successive signals each having a duration of one frame and each having the first signal state and a second signal state different from said first signal state, wherein the position or duration of said first signal state within the respective frames over which said successive signals are defined is altered by a certain amount between each successive signal; and a receiving side for receiving burst signal transmitted from the communication satellite and comprising counting means for counting the number of frames of the burst signals transmitted during a duration from the detection of said first signal to the detection of the next first or second state at a predetermined time slot in a frame of the burst signals, and means for determining the sending timing of the same station in accordance with said counted number of frames and said certain amount that the position or duration of said first signal state is altered between the respective frames of said successive signals.

2. A system according to claim 1, in which said sending side comprises a first/AND gate for providing an AND output of a start signal and frame pulses, a signal generator connected to the output of the first AND gate for generating a signal of the first state in response to the output of the first AND gate, a first counter for counting the frame pulses at the output of the first AND gate to terminate the signal of the first state by controlling the signal generator in response to the carry pulse thereof, a second counter for counting symbol pulses employed for providing a communication speed in the sending side after the carry pulse of the first counter to define a duration of said one frame length plus the certain amount by the intervals of carry pulses of the same counter, a one-shot multivibrator having a time constant and controlled by the carry pulses of the second counter, a switch initially selecting the output of said signal generator and thereafter selecting the output of the one-shot multivibrator after the carry pulse of the first counter, a carrier generator, and a second AND gate for providing an AND output of the outputs of the switch and the carrier generator.

3. A system according to claim 1, in which said receiving side comprises threshold means for detecting the transmitted burst signals by the use of a narrow aperture gate pulse defining said predetermining time slot, a digital integrator connected to the output of said threshold means for detecting the first state, and a third counter counting frame pulses from the first detection of said first state to the second detection of said first state to obtain the counted number of frames.

4. A system according to claim 3, further comprising second threshold means for detecting the transmitted burst signals by the use of a relatively wide aperture gate pulse in comparison with the narrow aperture gate pulse, a second digital integrator connected to the output of said second threshold means for detecting the first state, and a second switch for switching the transmitted burst signals from said second threshold means to said first threshold means in response to the output of said second digital integrator.

* * * * *